United States Patent Office 2,904,379
Patented Sept. 15, 1959

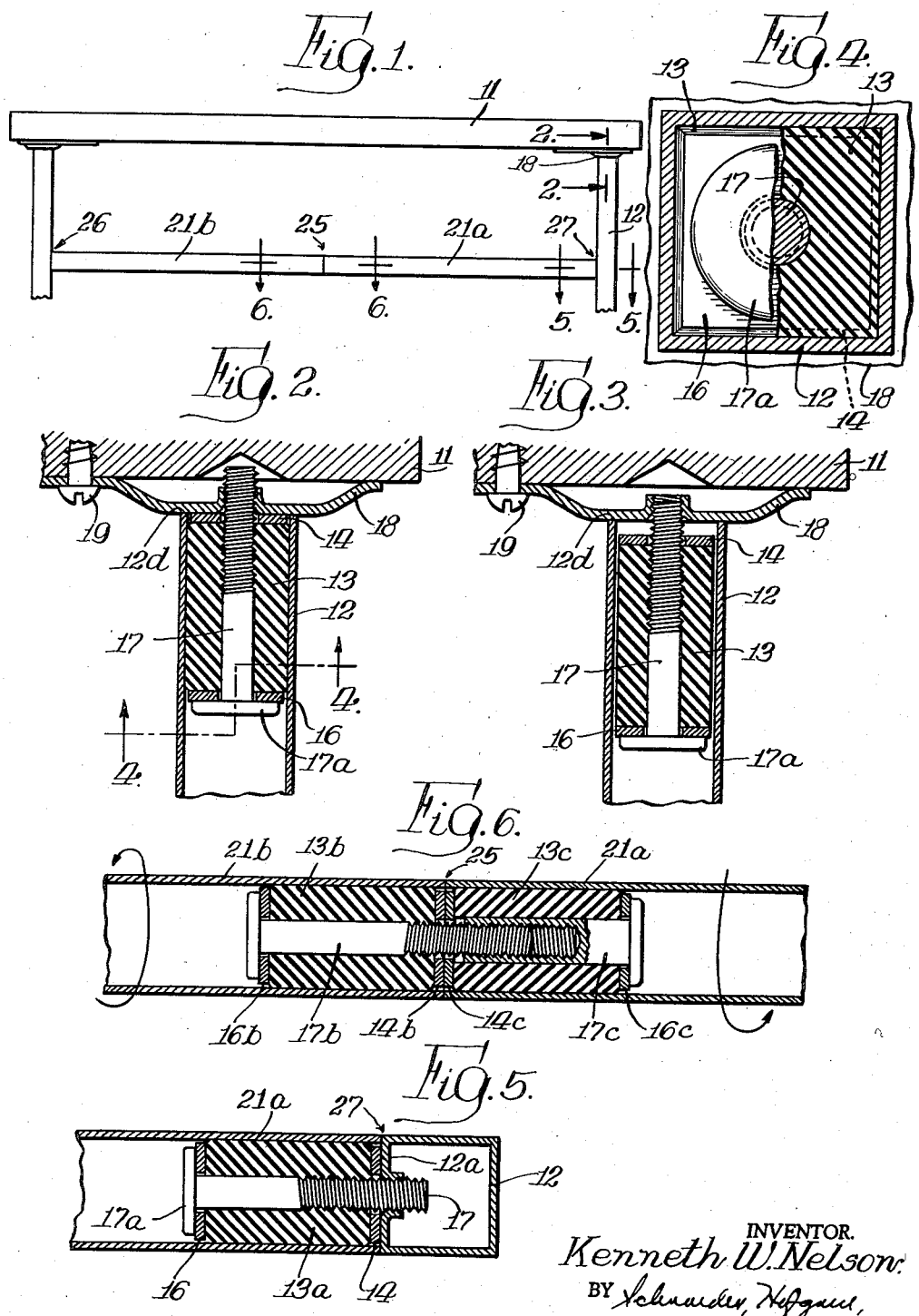

2,904,379

HOLLOW SUPPORT STRUCTURES HAVING HIDDEN CONNECTING MEANS

Kenneth W. Nelson, Chicago, Ill., assignor to Rada Products Company, a corporation of Illinois Application May 22, 1958, Serial No. 737,164

5 Claims. (Cl. 311—114)

The present invention pertains to support structures for household furnishings and particularly to tubular support members and means associated therewith for positively and invisibly positioning and securing the support members without deformation of the side walls thereof.

The metal tubular support for household furnishings such as television and phonograph stands, end tables, coffee tables and the like has, in recent years, become the focal point of furniture design. Because these tubular supports serve an esthetic as well as functional purposes, the designers have departed from the ferrous metals and gone into the non-ferrous metals such as brass and aluminum. The utilization of the non-ferrous metals has brought about a fabrication problem because of the inability to weld these materials and the disinclination to detract from the ornamental value of the tubular support by marring its surface by deformation or the insertion of screws therethrough.

In addition to the esthetic objections to using an external fabricating means such as a screw or bolt, ornamental aluminum and brass, being relatively soft metals, are not well suited to the concentrated shear stress in the area of the screw and have a tendency to compress, thereby enlarging the hole and rendering the supports unsuitable.

Modern marketing methods dictate that home furnishings be sold and shipped in a "knocked-down" state. It is, therefore, imperative that the components, such as the support structure, may be easily assembled in the home—preferably without the use of tools of any sort.

It is, therefore, a primary object of this invention to provide a tubular support having regular uninterrupted side walls and internal securing means for positively positioning the supports.

Another object of this invention is to provide a tubular support with a friction sleeve connection for distributing the securing force over a relatively large area of the tubular surface, and to impart direction to the tube.

Still another object of this invention is to provide a tubular support for household furnishings which is adapted to easy home assembly or disassembly without deterioration of the support or the furnishings and without the use of tools.

These and other objects of this invention will be apparent to one skilled in the art upon reading the following detailed description in conjunction with the drawings, wherein:

Fig. 1 is a partial side elevational view of a table illustrating the tubular supports of this invention;

Fig. 2 is an enlarged partial sectional view of a support of this invention in a secured position on the table along the line 2—2 in Fig. 1 as indicated;

Fig. 3 is the same as Fig. 2 with the tubular support shown in an unsecured position;

Fig. 4 is an enlarged partial sectional view of a support of this invention taken along the line 4—4 of Fig. 2 as indicated;

Fig. 5 is an enlarged sectional view taken along the line 5—5 of Fig. 1 as indicated, illustrating a support of this invention in perpendicular engagement; and Fig. 6 is an enlarged sectional view taken along the line 6—6 of Fig. 1 as indicated, illustrating the colinear engagement of the supports of this invention.

As shown in the drawings, the supports of this invention comprise a hollow tubular member with an elongated compressible friction sleeve insert therein and compressing means, operable by the rotation of the tube relative to the member to which it is to be secured, for laterally expanding the friction sleeve into securing engagement with the inner surface of the tube wall, while the face of the sleeve and the end face of the tube are tightly engaged with an anchor plate or the like to impart direction to the tube.

Referring now to the drawings, Figs. 1, 2, 3 and 4 illustrate the supports of this invention applied to table top 11 or other article of furniture. The support comprises a tube 12 illustrated here as being square in cross section but which may be of any non-circular cross sectional shape, a friction sleeve 13 having a pair of compression plates 14 and 16 of the same configuration as the cross section of the tube on either end thereof and a threaded member or bolt 17 fixed to the inner compression plate 16 and slidably engaged with the friction sleeve 13 and the outer compression plate 14. The bolt 17 is longer than the uncompressed friction sleeve (Fig. 3) so as to be engageable with a tapped hole associated with the table top 11, such as in an anchor plate 18 which is secured to the top 11 by means of wood screws 19 or any other suitable means of attachment for positioning the sleeve 13 thereon without longitudinal compression. The friction sleeve 13, which is at least twice as long as its cross sectional diameter, is preferably, but not necessarily, of the same cross sectional shape and slightly smaller than the opening in the tube 12 and is composed of rubber or other resilient material having a high coefficient of friction. The friction sleeve 13 is made longer than it is wide to distribute the holding force which acts between the sleeve and the side walls of the tube over a greater area and to prevent angular movement of the tube relative to the sleeve after the sleeve is in its securing position.

One feature of the invention lies in the distribution of force along a relatively large area of the tubes so that the direction of the tube is governed by the direction of the bolt 17 due to its angle of engagement relative to the table top. As the bolt 17 is advanced, the outer compression plate 14 is moved into close engagement with the anchor plate 18 and the end face 12a of the tube is firmly seated thereon to impart a direction to the tube which is perpendicular to the anchor plate. In this manner, the angle at which the tubular leg is secured to the table top may be selected by varying the angle of the anchor plate 18 to top 11.

The inner compression plates 16 is adhered to the bolt 17 as a bolt head so that the bolt is rotatable therewith and the outer compression plate 14 serves as a buffer between the outer sleeve and the material surrounding the tapped hole, thereby presenting a metal-to-metal or metal-to-wood contact having a relatively low sliding coefficient of friction so as to ease the task of turning the sleeve to compress it and to minimize the wear on the sleeve.

In operation, the friction sleeve assembly including the sleeve 13, the bolt 17 and the compression plates 14 and 16 is assembled on the table top 11 by engaging the bolt 17 with the tapped hole in the anchor plate 18 and screwing the assembly far enough to hold it in place but not so far as to compress the friction sleeve. The tube 12 is then placed over the assembly so that its inner surfaces engage the plates 14 and 16 and its end surfaces 12a engage the anchor plate 18 and the tube is rotated to advance the bolt 17, by rotation of the inner compression plate 16, into the tapped hole. The advance of the bolt 17 brings the outer compression plate 14 into firm engagement with the anchor plate 18. Rotation of the outer compression plate which is secured to the outer end of the sleeve 13 assures the rotation of the sleeve without any twisting shear being applied thereto by the tube. Further rotation of the tube 12 moves the inner compression plate 16 toward the outer compression plate 14 to longitudinally compress the sleeve 13 and firmly seat the outer face 12d of the tube on the anchor plate 18. The longitudinal compression of the sleeve 13 causes a lateral expansion of the sleeve into secure contact with the inner wall of the tube to positively position the tubular support perpendicular to the anchor plate at a predetermined angle to the table top.

Referring now to Figs. 1 and 5, a tubular support is utilized as a cross member 21a by securing a friction sleeve 13a to a side wall 12a of the upright support or leg 12 in the same manner as described above for securing the friction sleeve to the anchor plate 18 with a bolt 17a being advanced into a tapped hole in the wall 12a by rotation of the tube 21a to rotate the compression plates 14a and 16a causing lateral expansion of the sleeve.

With a slight modification, the above described support structure may be used in colinear attachment as illustrated in Fig. 6. The bolt 17b in the friction sleeve 13b which is positioned in a tube 21b has a left-hand thread so that when the joint at 25 (Fig. 1) is formed by rotating the tubes 21a and 21b relative to one another, the junctions at 26 and 27 are tightened instead of loosened. The sleeve 13c which is positioned in the tube 21a has an internally threaded member 17c therethrough for engagement with the bolt 17b in the sleeve 13c. Each threaded member 17b and 17c has associated therewith an inner compression plate 16b and 16c respectively and an outer compression plate 14b and 14c respectively which are of the same shape and function as the compression plates in the above described embodiments.

In operation, the two sleeves 13b and 13c are inserted into ends of the tubes 21a and 21b with the bolt 17b engaged with the internally threaded member 17c. The tubes are then rotated in the direction indicated by the arrows (Fig. 6) to advance the bolt 17b into the threaded member 17c to impart longitudinal compression and lateral expansion to the friction sleeves 13b and 13c to form a positive junction at 25 between the two tubular support members 21a and 21b.

Disassembly of the described support structure is accomplished by merely reversing the assembly process to remove the longitudinal compression from the resilient sleeves and allow them to return to their normal state.

The foregoing detailed description is given for clearness of understanding only, and no unnecessary limitations are to be understood therefrom, as modifications will be obvious to those skilled in the art.

I claim:

1. A support structure arranged to be connected to a first member having a planar portion concentric of a threaded bore, comprising: a support member having an end terminating in a plane and a recess extending perpendicularly to said plane to open through said end and having a non-circular portion at a distance from said plane; a transversely distensible member in the recess; and pressure means having a transverse portion complementary to and movable longitudinally through said non-circular portion of the recess, and a longitudinal portion extending from said transverse portion through said plane and having a threaded portion without said recess for threaded engagement with the threaded bore of the first member, said distensible member extending substantially between said plane and said transverse portion whereby said support member may be rotated about its longitudinal axis to rotate said transverse portion therewith and advance said threaded portion into the threaded bore with the end of the support member juxtaposed to the planar portion of the first member to cause the transverse portion to bear against and distend the distensible member into gripping engagement with the walls of the recess and maintain said end of the support member fixedly juxtaposed to the planar portion of the first member.

2. The support structure of claim 1 including a plate between said distensible member and said plane for precluding rotation of said distensible member against the first member.

3. A support structure arranged to be connected to a first member having a planar portion concentric of a threaded bore, comprising: a tubular support member having a non-circular cross section, said support member having an end terminating in a plane perpendicular to the axis thereof; a longitudinally compressible, transversely distensible annular member in the support member; and a bolt having a head complementary to and movable longitudinally through said support member, and a shank extending from said head, coaxially through said annular member and through said plane, said shank having a threaded portion without said support member for threaded engagement with the threaded bore of the first member, said distensible member extending substantially between said plane and said bolt head member whereby said support member may be rotated about its longitudinal axis to rotate said bolt head therewith and advance said threaded portion of the bolt into the threaded bore with the end of the support member juxtaposed to the planar portion of the first member to cause the bolt head to bear against and distend the annular member into gripping engagement with the walls of the support member and maintain said end of the support member fixedly juxtaposed to the planar portion of the first member.

4. A support structure comprising: a unitary member having a planar portion concentric of a threaded bore; a support member having an end terminating in a plane and a recess extending perpendicularly to said plane to open through said end and having a non-circular portion at a distance from said plane; a transversely distensible member in the recess; and pressure means having a transverse portion complementary to and movable longitudinally through said non-circular portion of the recess, and a longitudinal portion extending from said transverse portion through said plane and having a threaded portion without said recess for threaded engagement with the threaded bore of the first member, said distensible member extending substantially between said plane and said transverse portion whereby said support member may be rotated about its longitudinal axis to rotate said transverse portion therewith and advance said threaded portion into the threaded bore with the end of the support member juxtaposed to the planar portion of the first member to cause the transverse portion to bear against and distend the distensible member into gripping engagement with the walls of the recess and maintain said end of the support member fixedly juxtaposed to the planar portion of the first member.

5. A support structure, comprising: a first support member having an end terminating in a plane and a recess extending perpendicularly to said plane to open through said end and having a non-circular portion at a distance from said plane; a first transversely distensible member in the recess; first pressure means having a transverse portion complementary to and movable longitudinally through said non-circular portion of the recess, and a longitudinal portion extending from said transverse portion through said plane and having a threaded portion extending without said recess, said distensible member extending substantially between said plane and said transverse portion; a second support member colinearly aligned with the first support member, said second support member having an end terminating in said plane and a recess extending perpendicularly to said plane to open through said second support member end and having a non-circular portion at a distance from said plane; a second transversely distensible member in the recess; and second pressure means having a transverse portion complementary to and movable longitudinally through said non-circular portion of the recess of said second support member, and a longitudinal portion extending from said transverse portion of the second pressure means to short of said plane and having a threaded bore for threaded engagement with the threaded portion of the longitudinal portion of the first threaded means, said distensible members extending substantially between said plane and said transverse portions whereby said support members may be relatively rotated about their aligned longitudinal axes to rotate said transverse portions therewith and advance said threaded portion into the threaded bore with the end of the support members juxtaposed to cause the transverse portions to bear against and distend the distensible members into gripping engagement with the walls of the recesses and maintain said ends of the support members fixedly juxtaposed.

References Cited in the file of this patent

UNITED STATES PATENTS

| | | |
|---|---|---|
| 1,395,419 | Hutchins | Nov. 1, 1921 |
| 1,877,469 | Soper | Sept. 13, 1932 |
| 2,099,450 | Meyer | Nov. 6, 1937 |
| 2,214,177 | Baybould | Sept. 10, 1940 |
| 2,446,404 | Beyerle | Aug. 3, 1948 |
| 2,456,480 | Austin | Dec. 14, 1948 |
| 2,738,246 | Hogan | Mar. 13, 1956 |
| 2,809,876 | Huff | Oct. 15, 1957 |
| 2,842,415 | Keller | July 8, 1958 |